(12) United States Patent
Stege

(10) Patent No.: US 8,459,947 B2
(45) Date of Patent: Jun. 11, 2013

(54) WINGLET FOR A BLADE OF A WIND TURBINE

(75) Inventor: Jason Stege, Brande (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/406,834

(22) Filed: Feb. 28, 2012

(65) Prior Publication Data

US 2012/0230832 A1 Sep. 13, 2012

(30) Foreign Application Priority Data

Mar. 8, 2011 (EP) .................................. 11157315

(51) Int. Cl.
*F01D 5/14* (2006.01)
*F03D 11/00* (2006.01)

(52) U.S. Cl.
USPC .......... 416/62; 416/224; 416/235; 416/229 R; 416/241 A

(58) Field of Classification Search
USPC ........... 416/62, 228, 235, 237, 241 R, 241 A, 416/224, 229 R
See application file for complete search history.

(56) References Cited

U.S. PATENT DOCUMENTS

2008/0286110 A1* 11/2008 Gupta et al. .............. 416/241 A
2011/0255975 A1* 10/2011 Perless et al. ................. 416/176

FOREIGN PATENT DOCUMENTS

DE 102008002849 A1 11/2008
GB 2254382 A 10/1992
WO WO 2005031158 A2 4/2005

* cited by examiner

*Primary Examiner* — Igor Kershteyn

(57) ABSTRACT

A winglet for a blade of a wind turbine is disclosed. The winglet contains a core with a predetermined water absorption-rate to reduce or even avoid the absorption of water in the core. This may be achieved via different variations on the core material and/or core cover material including composition, density and thickness.

9 Claims, 1 Drawing Sheet

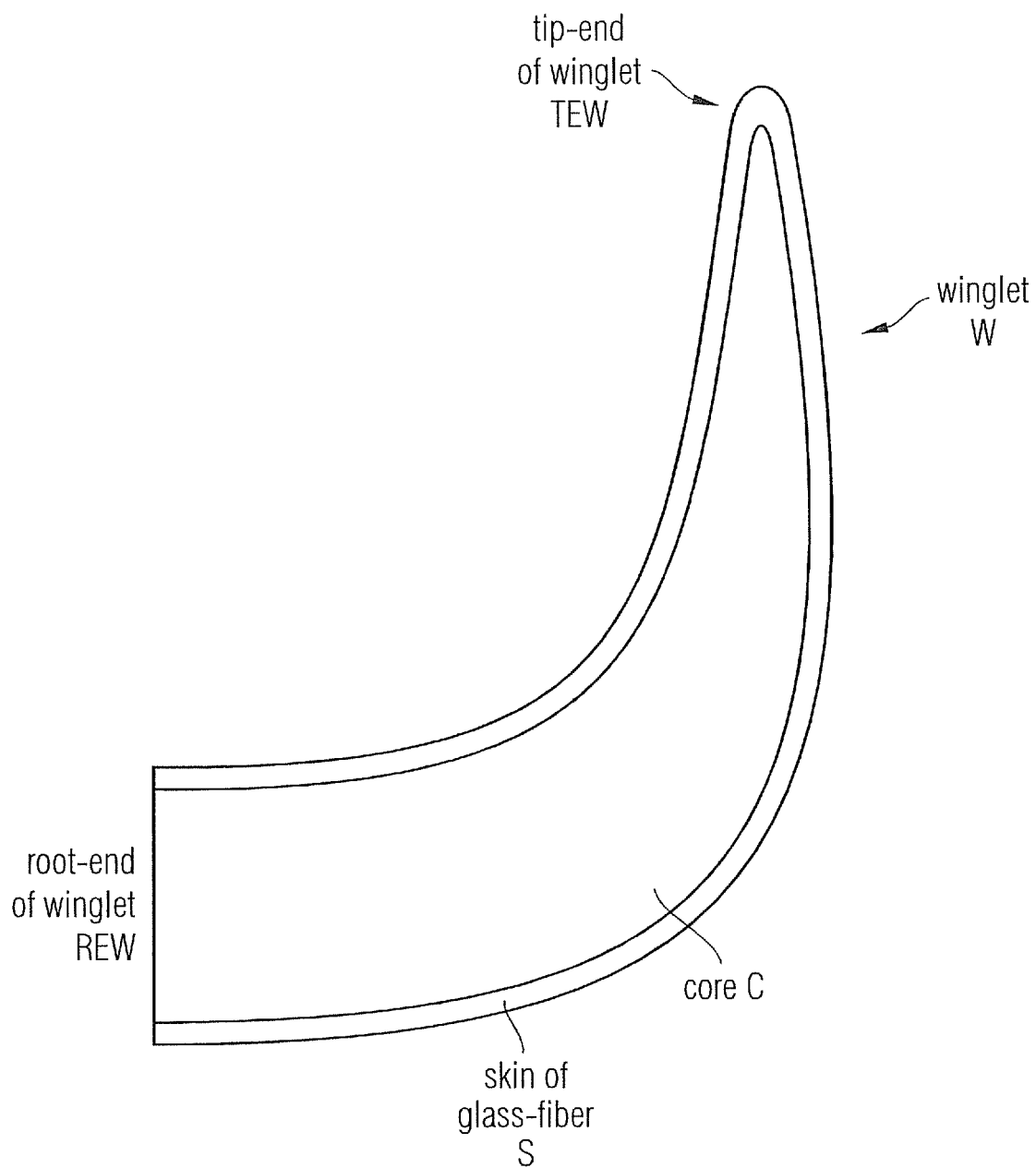

WINGLET FOR A BLADE OF A WIND TURBINE

CROSS REFERENCE TO RELATED APPLICATIONS

This application claims priority of European Patent Office application No. 11157315.0 EP filed Mar. 8, 2011. All of the applications are incorporated by reference herein in their entirety.

FIELD OF INVENTION

The invention relates to a winglet for a blade of a wind turbine.

BACKGROUND OF INVENTION

Sometimes a blade of a wind turbine is equipped with a winglet to improve the aerodynamic characteristics of the blade.

The winglet may be connected to the blade asides the final site of the wind turbine to simplify the transportation of the blade.

It is also possible to retrofit an already mounted blade with a winglet if there is the need due to specific conditions at the wind turbine site.

The mounting of blades towards a hub of a wind turbine has to be done very carefully due to the weight and due to the dimensions of the blade. This work becomes more difficult if the blade shows an additional winglet on its end.

This kind of work is quite expensive as special designed vessels with huge cranes are needed. Additionally there is the need for calm weather conditions to mount the huge blade to the hub.

It is known that lightning preferably strikes the wind turbine blades. Even the winglet may be harmed by lightning strikes.

Lightning strikes are especially problematic if the winglet contains a water-absorbing-material. The lightning strike evaporates the absorbed water into steam in only a split-second. Thus the winglet seems to explode due to the evaporated water.

SUMMARY OF INVENTION

It is therefore the aim of the invention to provide an improved winglet for a wind turbine, which is more resistant to the effects of lightning strikes as described above.

This aim is reached by the features of the claims. Preferred configurations of the invention are object of the dependent claims.

According to the invention the winglet for a wind turbine blade contains a core with a very low water absorption-rate. Thus the core does not or does nearly not absorb water.

The winglet is preferably made of epoxy foam. This foam prevents that water is absorbed by the core of the winglet.

Preferably a so called "lightweight epoxy foam" is used. Preferably the well known "Sicomin Epoxy Foam PB 250" is used.

The PB 250 is a two part epoxy formulation which produce closed cell low density foams. The densities obtained are respectively about 250 kg/m3 (open mould expansion). A hardener might modify curing time and reachable thickness.

Preferably the exterior surface of the core is covered by glass fiber. The glass fiber covers the core like a skin.

Preferably the skin shows a thickness between 1 mm and 5 mm.

Due to the materials being used for the core and for its skin the winglet is quite strong in view to mechanical forces that are acting on the winglet and on the tip end of the blade.

The winglet-construction is capable to withstand forces acting on the tip-end-region of modern wind turbine blades.

Preferably the winglet is casted by help of the well known "Vacuum Assisted Resin Transfer Mould, VARTM"-process.

This process ensures that voids, cavities, air inclusions, gaps or other weaknesses are reduced, which might result in an amount of absorbed water in the winglet.

Preferably the winglet is connected with the blade by glue or by an adhesive, which is applied between the blade and the winglet. The glue or adhesive is applied in a way that no voids, cavities, air inclusions, gaps or other weaknesses remain within the zone of connection. Thus no water may gather in this zone.

Due to the chosen winglet-materials the damaging effects of evaporated water are avoided or even reduced when lightning strikes the winglet.

As described above the winglet is optimized in view to the absorbed water. The whole winglet is as dry as possible. Thus even the risk that the winglet is hit by lightning strikes is reduced.

The winglet is strong and extremely light weight, thus it is best suited to retrofit an existing blade.

Due to the light weight of the winglet it is even possible to cope with centrifugal forces, which are quite strong at the tip-end region of the blade.

BRIEF DESCRIPTION OF THE DRAWINGS

The invention is shown in more detail by help of the sole FIGURE which shows a preferred configuration in a cross sectional view and does not limit the scope of the invention

DETAILED DESCRIPTION OF INVENTION

Referring to the FIGURE, the winglet W shows a tip-end TEW and a root-end REW. The root-end REW is prepared to be connected with the tip-end of a blade (not shown here).

The core C of the winglet W shows a very low water absorption-rate, thus the absorption of water in the core is reduced as best as possible or is even avoided.

The core C is preferably made of a light weight epoxy foam as described above.

The core C is covered by a skin, which contains glass fibers S preferably.

The invention claimed is:
1. A winglet for a blade of a wind turbine, comprising:
   a core with a predetermined water absorption-rate to reduce or even avoid the absorption of water in the core,
   wherein the core of the winglet is made of a lightweight epoxy foam, and
   wherein the lightweight epoxy foam has a density of 250 kg/m3.
2. The winglet according to claim 1,
   wherein the exterior surface of the core is covered by a sheet of glass fiber.
3. The winglet according to claim 2,
   wherein the glass fiber covers the core like a skin with a thickness between 1 mm and 5 mm.
4. The winglet according to claim 1,
   where the winglet is prepared for a connection with a blade of a wind turbine.

5. A winglet for a blade of a wind turbine, comprising:
a core with a predetermined water absorption-rate to reduce or even avoid the absorption of water in the core,
wherein the exterior surface of the core is covered by a sheet of glass fiber.

6. The winglet according to claim 5,
wherein the glass fiber covers the core like a skin with a thickness between 1 mm and 5 mm.

7. The winglet according to claim 5,
wherein the core of the winglet is made of a lightweight epoxy foam.

8. The winglet according to claim 5,
wherein the lightweight epoxy foam show a density of 250 kg/m3.

9. The winglet according to claim 5,
where the winglet is prepared for a connection with a blade of a wind turbine.

\* \* \* \* \*